United States Patent [19]

Takahashi et al.

[11] Patent Number: 5,136,219
[45] Date of Patent: Aug. 4, 1992

[54] ELECTRIC-CAR CONTROLLER

[75] Inventors: Nobuyoshi Takahashi; Koichi Kaminishi; Minoru Kaminaga, all of Katsuta, Japan

[73] Assignees: Hitachi, Ltd.; Hitachi Automotive Engineering Co., Ltd., both of Tokyo, Japan

[21] Appl. No.: 680,070

[22] Filed: Apr. 3, 1991

[30] Foreign Application Priority Data

Apr. 4, 1990 [JP] Japan ................... 2-088234

[51] Int. Cl.⁵ ................... B60L 15/08; H02P 7/29
[52] U.S. Cl. ................... 318/139; 318/257; 318/268; 388/831
[58] Field of Search ............... 318/139, 256, 257, 258, 318/259, 260, 261, 262, 263, 268, 269, 270, 271, 273, 274, 276, 599; 388/830, 831

[56] References Cited

U.S. PATENT DOCUMENTS

| | | | |
|---|---|---|---|
| 3,764,870 | 10/1973 | Morton et al. | 318/139 |
| 3,818,291 | 6/1974 | Miyake | 318/139 |
| 3,936,707 | 2/1976 | Yoshida et al. | 318/139 |
| 4,171,532 | 10/1979 | Sloan et al. | 361/13 |
| 4,195,254 | 3/1980 | Gurwicz et al. | 318/473 X |
| 4,345,190 | 8/1982 | Horiuchi et al. | 318/338 |
| 4,508,999 | 4/1985 | Melocik et al. | 318/331 |
| 4,511,947 | 4/1985 | Melocik | 361/191 |

Primary Examiner—Bentsu Ro
Attorney, Agent, or Firm—Antonelli, Terry, Stout & Kraus

[57] ABSTRACT

The present invention is directed to an electric-car controller comprising a chopper for controlling the speed of a DC motor, a by-pass contactor for applying a DC source voltage directly to the DC motor, means for detecting that an acceleration command has reached a certain specified value or above, means for detecting that the acceleration of the car has dropped to a certain specified value or below, and means for turning on the by-pass contactor when the acceleration command has reached the certain specified value or above and the acceleration of the car has dropped to the certain specified value or below.

7 Claims, 3 Drawing Sheets

PRESENT INVENTION

ELECTRIC-CAR CONTROLLER

BACKGROUND OF THE INVENTION

This invention relates to a controller for a battery-powered forklift car and so on, and particularly to an electric-car controller suitable for controlling a by-pass contactor.

An example of an electric-car controller is disclosed in JP-A-61-106006. In this example, when an acceleration command reaches a certain specified value or above and the chopper duty factor becomes more than a specified value, or when the acceleration command is maintained at a certain value or above for a predetermined time, the by-pass contactor is turned on. However, when the load on the car is large or when the car starts to go up a slope, the chopper duty factor is not increased because of the current limiting action of the chopper. Since the by-pass contactor is turned on after a constant delay and then the car is accelerated, the acceleration occurs in two steps, thus producing an unpleasant sense of acceleration. Moreover, since a current close to the current limit value (maximum control current) flows in the chopper during the predetermined delay, the chopper element generates a lot of heat. The original object of the by-pass contactor is to produce a driving force greater than that produced by the chopper by directly applying a DC source voltage to the DC motor. Thus, it is necessary to turn on the by-pass contactor faster for a larger running load such as when the car starts to go up a slope or when the load on car is large. The conventional apparatus, however, does not consider this aspect, and thus the by-pass contactor is turned on later for a large running load than for a small running load.

SUMMARY OF THE INVENTION

Accordingly, it is an object of the invention to turn on the by-pass contactor to provide a pleasant sense of acceleration and the most suitable operating conditions and reduce the heat generated by the chopper element.

The above object is achieved by turning on the by-pass contactor when an acceleration command reaches a specified value or above and the acceleration of the car drops to a specified value or below.

In this invention, the by-pass contactor is turned on when the acceleration command reaches operating a specified value or above and the acceleration of the car is lowered to a specified value or below. Thus, if the increase in the chopper duty factor is reduced by the current limiting action when the load on car is large or when the car starts to go up a slope, the acceleration of the car is determined to have dropped to a specified value or below, and the by-pass contactor is turned on without delay. Therefore, the acceleration does not occur in two steps and the chopper element has no time to generate heat since there is no delay. Moreover, since the acceleration is reduced faster when the running load is large than when it is small (the acceleration quickly drops to a specified value or below), the by-pass contactor is turned on faster, for a larger running load such as when the car starts to go up a slope or when the load on car is large.

DESCRIPTION OF THE PREFERRED EMBODIMENTS

One embodiment of this invention will be described with reference to FIGS. 1, 2, 3A and 3B.

Figure 1:
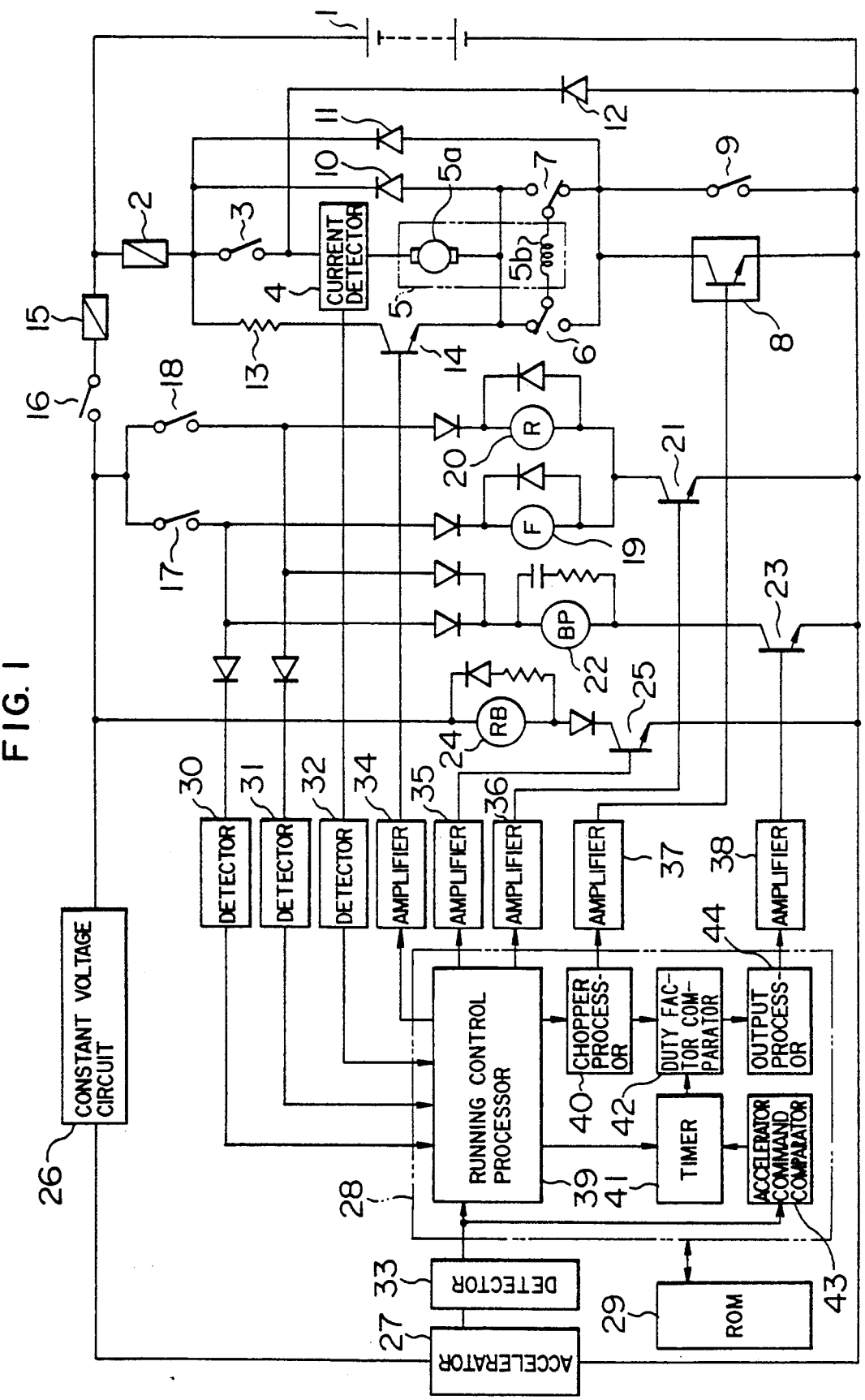
FIG. 1 is a circuit block diagram of one embodiment of the invention.

FIG. 1 is a circuit block diagram of this embodiment. The circuit arrangement of this embodiment comprises a main circuit including a battery 1, a fuse 2, a regenerative contactor 3, a current detector 4, an armature winding 5a and field winding 5b of a DC motor 5, a forward contactor 6, a retrogressing contactor 7, a chopper transistor 8, a by-pass contactor 9, a plugging diode 10, a free-wheel diode 11, a regenerative diode 12, a stand-by exciting resistor 13 and an initial exciting transistor 14, and a control circuit including a fuse 15, a key switch 16, a forward switch (FSW) 17, a retrogressing switch (RSW) 18, a forward contactor drive coil 19, a retrogressing contactor drive coil 20, a forward/reverse contactor drive transistor 21, a by-pass contactor drive coil 22, a by-pass contactor drive transistor 23, a regenerative contactor drive coil 24, a regenerative contactor drive transistor 25, a constant voltage circuit 26, an accelerator 27, a microcomputer 28, a ROM 29, detection circuits 30, 31, 32, 33, and amplification circuits 34, 35, 36, 37, 38. The microcomputer 28 executes the program stored in the ROM 29 by use of a running control processor 39, a chopper output processor 40, a timer 41, a chopper duty factor comparing processor 42, an acceleration command comparing processor 43, and a by-pass contactor turn-on command output processor 44.

The operations from the starting operation up to the by-pass contactor turn-on operation will be described below. When the key switch 16 is turned on, the constant voltage circuit 26 is operated to supply a source voltage to the control circuit. Thus, the microcomputer 28 starts the processing in accordance with the program previously stored in the ROM 29. After starting, the running control processor 39 of the microcomputer 28 turn the transistor 25 on through the amplification circuit 35, supplying a current to the coil 24 to turn the regenerative contactor 3 on. When the FSW 17 is turns on, the output of the detection circuit 30 is supplied to the microcomputer 28. The running control processor 39 of the microcomputer 28 turns the transistor 21 on through the amplification circuit 36, supplying a current to the coil 19, turning the forward contactor 6 on. Then, when the accelerator 27 is depressed, the output of the detection circuit 33 is supplied to the microcomputer 28 as a command. The acceleration command comparing processor 43, enables the timer 41 to count when the acceleration command is a certain specified value (for example, 90% of the full opening of the accelerator) or above. The running control processor 39 does not enable the timer 41 to count during the regenerative braking and plugging. The running control processor compares the current value fed from the current detector 4 through the detection circuit 32 with the acceleration command, computes the chopper duty factor, and then sends a command to the chopper output processor 40. The chopper output processor 40 turns the transistor 8 on and off through the amplification circuit 37, thus permitting the battery 1 to supply a DC voltage to the DC motor 5. When the revolution rate of the DC motor 5 increases, the chopper duty factor also increases with the increase in the induced voltage. Thus, it is considered that the chopper duty factor approximately represents the revolution rate (representing car speed) of the DC motor 5. When the timer 41 is enabled to count by the acceleration command comparing processor 43 and the running control processor 39, the timer 41 and the chopper duty factor comparing processor 42 detect the chopper duty factor at predetermined intervals (for example, every 0.3 sec). When the amount of change of the chopper duty factor (the acceleration of the car) drops to a specified value (for example, 10%) or below, the timer and the chopper duty factor comparing processor enable the by-pass contactor turn-on command output processor 44 to turn on the by-pass contactor. The output from the by-pass contactor turn-on command output processor 44 is supplied through the amplification circuit 38 to the transistor 23, turning the transistor 23 on. Thus, a current flows in the coil 22, turning the by-pass contactor 9 on.

Figure 2:
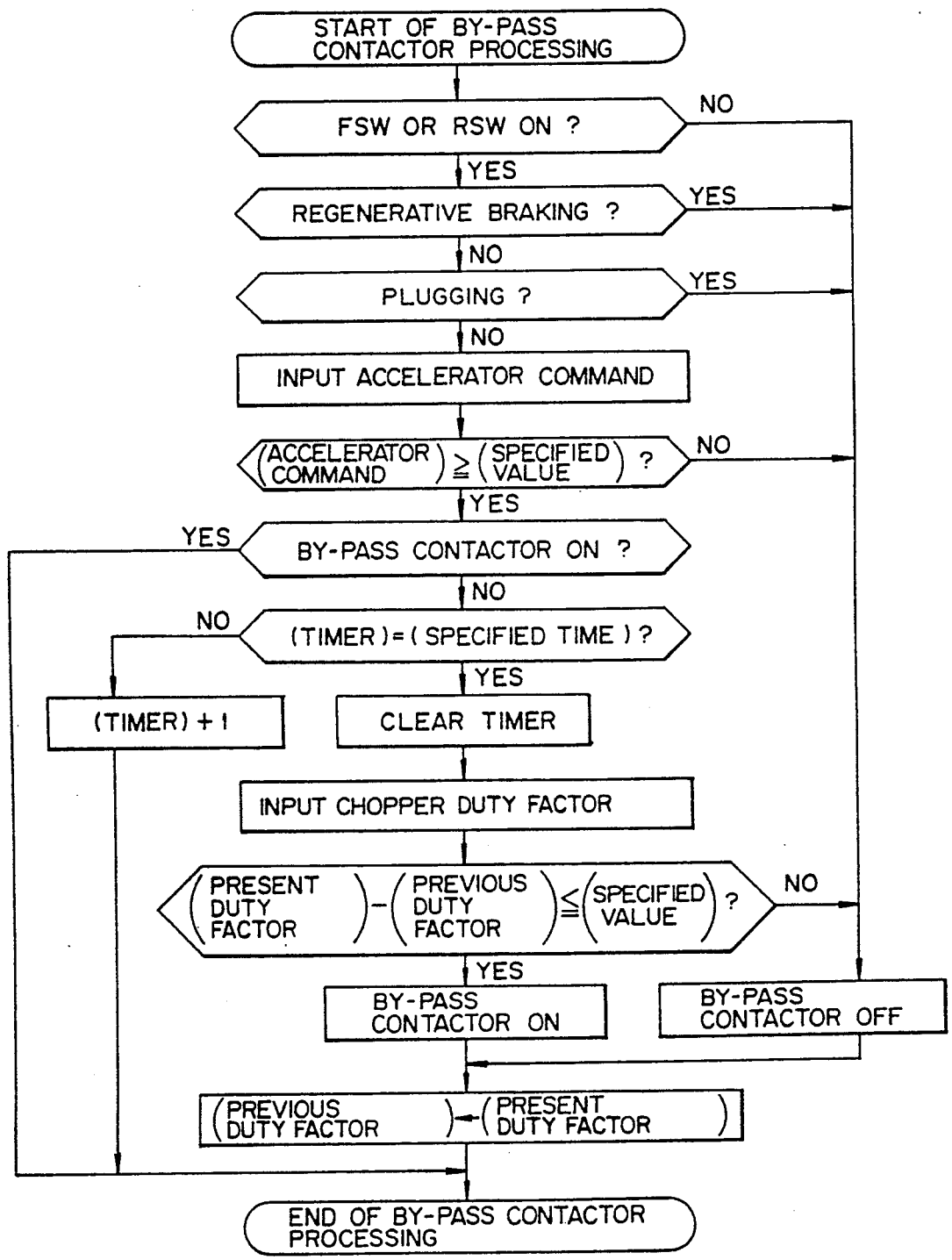
FIG. 2 is a flowchart of a program for performing by-pass contactor turn-on processing in the embodiment of the invention.

FIG. 2 is a flowchart of a program for turning on the by-pass contactor in this embodiment.

Figure 3A:
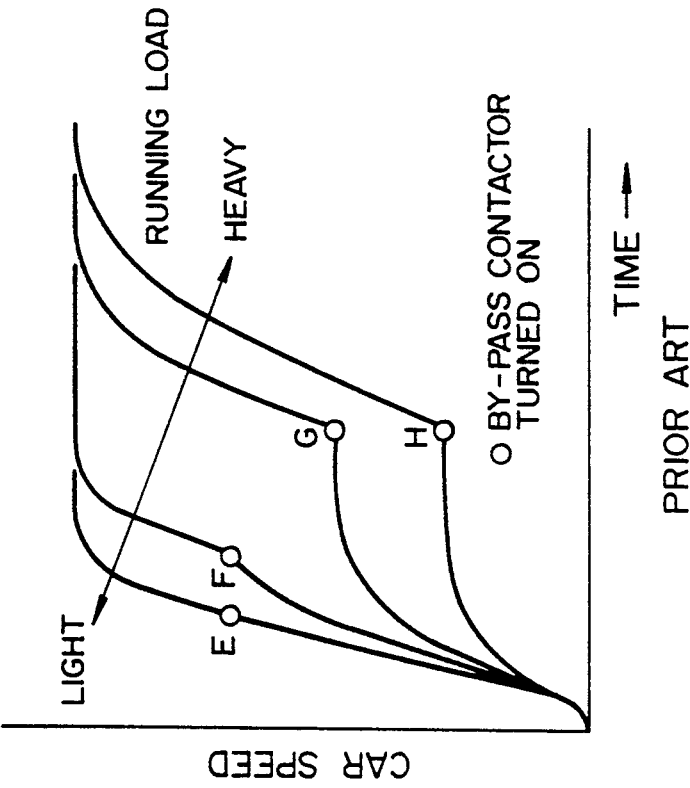
FIG. 3A shows curves of the acceleration characteristics of the car of the embodiment of this invention.
Figure 3B:
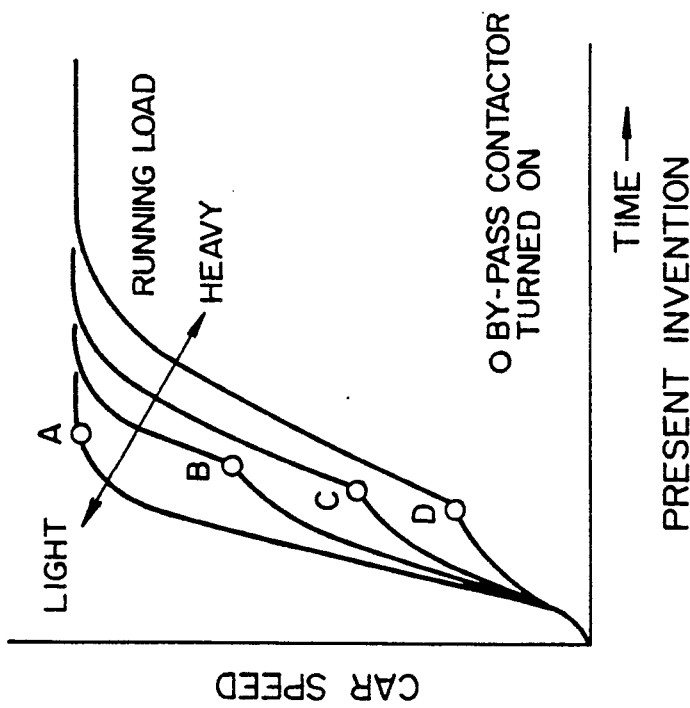
FIG. 3B shows curves of the acceleration characteristics of the car according to the prior art.

FIG. 3A shows the acceleration characteristic curves of the car according to this embodiment, and FIG. 3B shows the acceleration characteristic curves of the conventional car. These curves in FIGS. 3A and 3B are obtained when the car starts from a standstill under full acceleration. The running loads for the 4 characteristic curves in each of FIGS. 3A and 3B increase in the order of left to right. In the prior art, under full acceleration, the by-pass contactor is turned on when the chopper duty factor reaches a certain specified value or above (at points E, F in FIG. 3B) or after a predetermined time (at points G, H in FIG. 3B). Thus, when the running load is large as shown in FIG. 3B at points G and H, the car is accelerated in two steps by the turn-on of the by-pass contactor, so that until the contactor is turned on, a current of nearly the limit value flows in the chopper transistor, excessively heating it. In addition, the contactor is turned on later for a large running load than for a small running load. According to the acceleration characteristic curves of this embodiment, when the acceleration of the car is reduced as shown in FIG. 3A, the by-pass contactor is turned on, preventing the acceleration from occurring in two steps as in FIG. 3B and preventing the chopper transistor from being excessively heated during the delay. Moreover, since the acceleration is reduced faster when the running load is large than when it is small, the by-pass contactor is turned on faster for a larger the running load as shown at points A, B, C, D in FIG. 3A.

Thus, according to this embodiment, the by-pass contactor can be turned on in accordance with the driving condition of the car so that a pleasant sensation of acceleration can be achieved and the heat generated in the chopper transistor can be reduced.

Therefore, according to this invention, since the by-pass contactor can be automatically turned on in accordance with the driving condition of the car, the car can always be driven with the most suitable running characteristics even when the car escapes from ditches, runs under plugging, and goes up a slope. Also, since the by-pass contactor can be turned on without delay even when the running load is large, the chopper element is not excessively heated during the delay and thus the reliability can be increased.

What is claimed is:

1. An electric-car controller including a chopper for controlling a speed of a DC motor, and a by-pass contactor for directly applying a DC source voltage to said DC motor, said electric-car controller comprising:
   means for detecting that an acceleration command for the electric-car has reached a certain first specified value or above;
   means for detecting that an acceleration of said car has dropped to a certain second specified value or below; and
   means for turning on said by-pass contactor when the acceleration command has reached said certain first specified value or above and the acceleration of said car has dropped to said certain second specified value or below.

2. An electric-car controller according to claim 1, wherein said means for turning on said by-pass contactor does not operate during regenerative braking or plugging, but does operate when the acceleration command has reached said certain first specified value or above and the acceleration of said car has dropped to said certain second specified value or below after said regenerative braking or said plugging has ceased.

3. An electric-car controller according to claim 1 or 2, wherein said means for detecting that the acceleration of said car has dropped to said certain second specified value or below includes means for detecting a chopper duty factor of said chopper at predetermined intervals, and means for detecting that an amount by which said chopper duty factor has changed during one of the predetermined intervals has dropped to a certain specified value or below.

4. An electric-car controller according to claim 1 or 2, wherein said means for detecting that the acceleration of said car has dropped to said certain second specified value or below includes means for detecting a revolution rate of said Dc motor at predetermined intervals, and means for detecting that an amount by which the revolution rate of said DC motor has changed during one of the predetermined intervals has dropped to a certain specified value or below.

5. An electric-car controller according to claim 2, wherein said means for turning on said by-pass contactor includes means for turning on said by-pass contactor when the acceleration command reaches a certain specified value or above upon starting the car, or when plugging has continued for a predetermined time.

6. An electric-car controller according to claim 3, wherein said means for turning on said by-pass contactor includes means for turning on said by-pass contactor when the acceleration command reaches a certain specified value or above upon starting the car, or when plugging has continued for a predetermined time.

7. An electric-car controller according to claim 4, wherein said means for turning on said by-pass contactor includes means for turning on said by-pass contactor when the acceleration command reaches a certain specified value or above upon starting the car, or when plugging has continued for a predetermined time.

* * * * *